United States Patent Office 3,823,021
Patented July 9, 1974

3,823,021
CEMENT COMPOSITIONS CONTAINING SODA LIME GLASS
Alex G. Jansen, 3812 N. Odell, Chicago, Ill. 60634
No Drawing. Filed June 19, 1972, Ser. No. 264,052
Int. Cl. C04b 7/02; C08h 17/04
U.S. Cl. 106—97                                 3 Claims

ABSTRACT OF THE DISCLOSURE

A cementitious composition for use for example, as overlay layers for concrete bases of improved adhesion property which comprises from about 20 to 66 parts by weight of cement, from about 80 to 34 parts by weight of silica sand and from about 0.1% to 1.5% by weight, based upon the weight of said cement, or glass particles having a particle size in the range of 2.6 to 233 mesh and being a soda lime type glass.

---

This invention relates to a cement composition. More particularly, it relates to a cement composition and an additive for incorporation in hydraulic cementitious mixtures such as grouts, mortars and concretes. Still more particularly, it relates to a cement composition and additive having as one of its principal objects the improvement of the property of adhesion to solid cement.

Briefly, the present invention comprises as a basic composition a cement, silica sand and glass particles having a particle size in the range of 2.6 to 233 mesh and being a soda lime type glass.

Hydraulic cementitious mixtures may be defined as mixtures comprising a cement, sand and/or aggregates such as finely divided siliceous particles, which upon mixing with water have the property of setting to a hardened mass. Such mixtures may contain the conventional Portland cement or the cements containing chemicals for imparting such properties as for example, fast setting, waterproofing, etc. One of the shortcomings of all of these cementitious mixtures is the limited tensile bond strength of overlay layers applied to bases.

Now it has been discovered that a novel characteristic of excellent adhesion, evidenced by improved tensile bond strength and avoidance of shrinkage, can be imparted to cementitious mixtures by incorporation of particulate glass of a specific chemical nature therein.

In accordance with this invention, a basic cement composition is provided which comprises a cement, a sand or aggregates of a particle size exceeding 200 mesh and from about 0.1% to about 1.5%, based upon the weight of said cement, of soda lime glass particles having a particle size in the range of 2.6 to 233 mesh.

More in detail, the cement compositions comprise on a dry composition basis, about 20 to 66 parts by weight of hydraulic cement, from about 80 to 34 parts by weight of silica sand or silica sand plus aggregates and from about 0.1% to 1.5% by weight based upon the weight of said hydraulic cement, of soda lime type glass of a particle size in the range of about 2.6 to 233 mesh.

Soda lime glass useful in the composition of this invention are particles of the amorphous products of a specific gravity of at least 2.3, produced by fusion at temperatures of the order of 550° C. of mixtures of not less than 62% of silica, calcium oxide and sodium carbonate, a typical illustration of weight proportions of which are 73% silica, 13% CaO and 14% sodium carbonate. Such glass may also contain such extraneous materials as 0.1% by weight of magnetic iron particles.

Soda lime glass may be present in various forms such as beads, or particles which are crushed or powdered glass. The preferred form of glass particles are glass beads or beads having coatings such as silicon of a diameter in the range of .0024 to 0.0661 inches. Crushed glass and powdered glass may have an average particle size of 2.6 to 233 mesh and preferably in the range of 4.2 to 120 mesh.

In preparing compositions containing for example 100 lbs. to 150 lbs. of cements, such as types 1, 2 and 3 sold in the market as Portland cement, one example of which is air-entrained, the glass content may be 8 ounces to 36 ounces, respectively.

The sand content of the basic mixture when the composition is a mortar form for covering brick, or other bases is generally of a size in the range of 2 to 8 mesh, preferably about 4 mesh. The mesh size of the sand utilized is varied directly with the thickness of an overlay layer.

Additives which are not essential to the present invention but which can be added, if desired, are plaster fibers, carborundum, coarse aggregates such as broken stone, gravel and limestone, and aggregates usually made from pumice, lava, slag, burned clay or shale, water-reducing agents such as aliphatic and aromatic hydroxy acids, their salts and their esters, air-entraining agents such as condensation products of the phenol-formaldehyde type, or latex type, soluble alkali salts of alkyl, acyl and alkyl-oryl sulfates and sulfonates, a setting accelerator such as calcium chloride, etc. For other special purposes, sealing, water repellent or aging agents can also be added to the mortars.

The invention is more specifically described by reference to specific examples illustrating variations in the compositions, such as cementitious compositions for concrete bases, and overlay layers for bases such as, for example, grout, latex type, cement plaster, etc., and the preferred manner of use of the compositions. Obviously, other formulations besides those described in detail in the following examples can be employed, depending upon the urgencies of the situation.

By way of illustration of the improvement provided according to this invention, the following examples were prepared with approximately the same water-cement ratios.

EXAMPLE I

A concrete batch was made up using 9 pounds of Portland cement, 30 pounds of washed silica sand, and 1 ounce of soda lime glass beads of size number 801–206.

The concrete batch was mixed with approximately 0.5 gallons of water. The wet mortar mixture is applied by free hand forming to various substrates.

EXAMPLE II

A concrete batch was made up using 9 pounds of Portland cement, 30 pounds of No. 4098 silica sand, and 2 ounces of soda lime glass beads of size number 801–206.

The concrete batch was mixed with approximately 0.5 gallons of water.

EXAMPLE III

A concrete batch was made up using 9 pounds of Portland cement, 9 pounds of No. 2 torpedo sand, 9 pounds of floured silica sand and 2 ounces of soda lime glass beads of size number 801–206.

The concrete batch was mixed with approximately 0.35 gallons of water.

EXAMPLE IV

A concrete batch was made up using 224 parts by weight of Portland cement, 176 parts by weight of No. 2 torpedo sand, 96 parts by weight of No. 4 size silica sand, 5 parts by weight of fly ash additive and 0.67 parts by weight of soda lime glass beads of size number 801–204.

The concrete batch was mixed with approximately 6.4 gallons of water.

EXAMPLE V

A concrete batch was made up using 20 pounds of No. 3 Portland cement, 20 pounds of No. 2 torpedo sand, 40 pounds of silica sand of a size passing through at 1/8 inch sieve, and 2 5/8 ounces of soda lime glass particles of an average size of 4.2 mesh.

The concrete batch was mixed with approximately 1 gallon of water.

EXAMPLE VI

A concrete batch was made up using 60 pounds of No. 1 Portland cement, 30 pounds of silica sand, and 1 ounce of soda lime glass particles of an average size of 170 mesh.

The concrete batch was mixed with approximately 1.5 gallons of water.

EXAMPLE VII

A concrete batch was made up using 12 pounds of No. 1 Portland cement, 6 pounds of hydrated lime, 50 pounds of No. 4 sieve silica sand and 1 ounce of glass particles of an average size of 200 mesh.

The concrete batch was mixed with approximately 1/2 gallon of water. Such a mixture has utility as a brick mortar.

Concrete bases, the surfaces of which are to be overlayed are thoroughly cleaned by one or more of the procedures known as sandblasting, washing with acid solution, detergent solution or ammonium solutions. After mixing the products of Examples I through VII, to obtain a plastic mixture, the mixtures were applied to cleaned concrete bases, using the appropriate tools of the trade with the thickness of the coating visually regulated using screed rings as a guide.

After aging, for about a week, the layers of Examples I through VII showed strong adhesion and no tendency to flake or crack.

Although we have described preferred embodiments of the present invention, it will be understood that these are not to be regarded as limitations on the scope of the invention except insofar as included in the accompanying claims.

I claim:

1. A cement composition comprising a cement, sand and from about 0.1% to about 1.5%, based upon the weight of said cement, of glass particles, said glass particles having an average size in the range of 2.6 to 233 mesh and being a soda lime type glass.

2. A cement composition consisting essentially of approximately 20 to 66 parts by weight of Portland cement, approximately 80 to 34 parts by weight of sand and approximately 0.1% to 1.5% by weight of soda lime glass beads based upon the weight of Portland cement, and the beads having a diameter in the range of about .0024 to 0.0661 inches.

3. A cement composition according to claim 1 wherein the glass particles are crushed glass of an average particle size in the range of 4.2 to 120 mesh.

References Cited

FOREIGN PATENTS

| | | |
|---|---|---|
| 1,936,857 | 2/1971 | Germany. |
| 19,346 | 8/1911 | Great Britain. |
| 481,752 | 3/1938 | Great Britain. |

OTHER REFERENCES

Goldfein, S.: "Fibrous Reinforcement for Portland Cement," *Modern Plastics,* April 1965, pp. 150+.

Morey, G.: *The Properties of Glass,* 1954, pp. 75–76, 143.

Tooley, F.: *Handbook of Glass Manufacture,* 1958, p. 245.

DELBERT E. GANTZ, Primary Examiner

S. L. BERGER, Assistant Examiner